United States Patent [19]

Taylor

[11] 4,199,780
[45] Apr. 22, 1980

[54] VIDEO DROP OUT COMPENSATOR INCORPORATING DIGITAL FIELD STORAGE

[75] Inventor: Richard J. Taylor, London, England

[73] Assignee: Quantel Limited, Berkshire, England

[21] Appl. No.: 953,324

[22] Filed: Oct. 20, 1978

[30] Foreign Application Priority Data

Oct. 27, 1977 [GB] United Kingdom ............... 44781/77

[51] Int. Cl.² ............................................. H04N 5/76
[52] U.S. Cl. ............................................ 358/8; 360/38
[58] Field of Search ...................... 358/8, 127; 360/36, 360/38

[56] References Cited

U.S. PATENT DOCUMENTS

| | | | |
|---|---|---|---|
| 3,949,416 | 4/1976 | Stalley et al. ............................. | 358/8 |
| 3,969,760 | 7/1976 | Coffey ...................................... | 358/8 |
| 3,974,519 | 8/1976 | van den Bussche ..................... | 358/8 |
| 4,054,903 | 10/1977 | Ninomiya ................................ | 358/8 |
| 4,063,284 | 12/1977 | Tatami .................................. | 360/38 X |
| 4,065,787 | 12/1977 | Owen et al. ......................... | 360/36 X |
| 4,081,826 | 3/1978 | Ninomiya ................................ | 358/8 |
| 4,122,489 | 10/1978 | Bolger et al. ............................ | 358/8 |

Primary Examiner—Bernard Konick
Assistant Examiner—Donald McElheny, Jr.
Attorney, Agent, or Firm—Dowell and Dowell

[57] ABSTRACT

A system and method for compensating for drop outs present at the tape output of a video tape recorder. Compensation is effected by storing video information for at least one field in a field or frame store and detecting the presence of drop outs. When a drop out is detected the writing in of information to the store is inhibited so that the previously stored data is retained. The compensator may include additional storage for storing data indicative of drop out and frame identification so as to control processing at the store output to maintain correct color sub-carrier phase.

12 Claims, 8 Drawing Figures

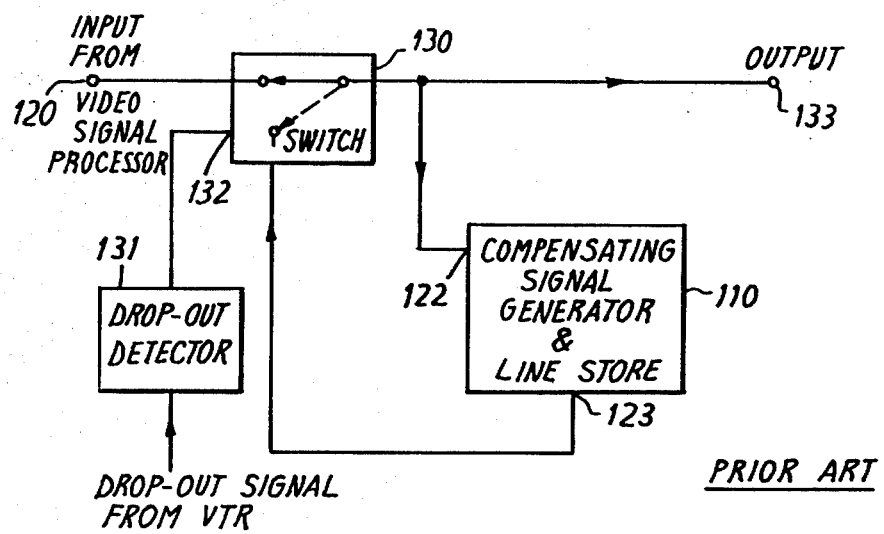
FIG.1 — PRIOR ART
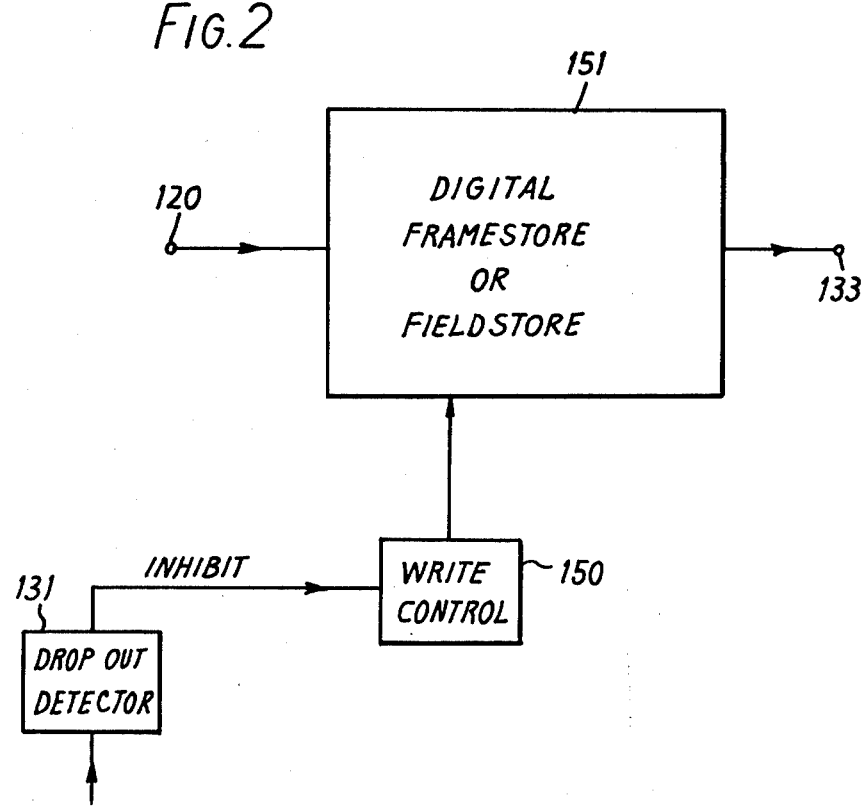
FIG.2

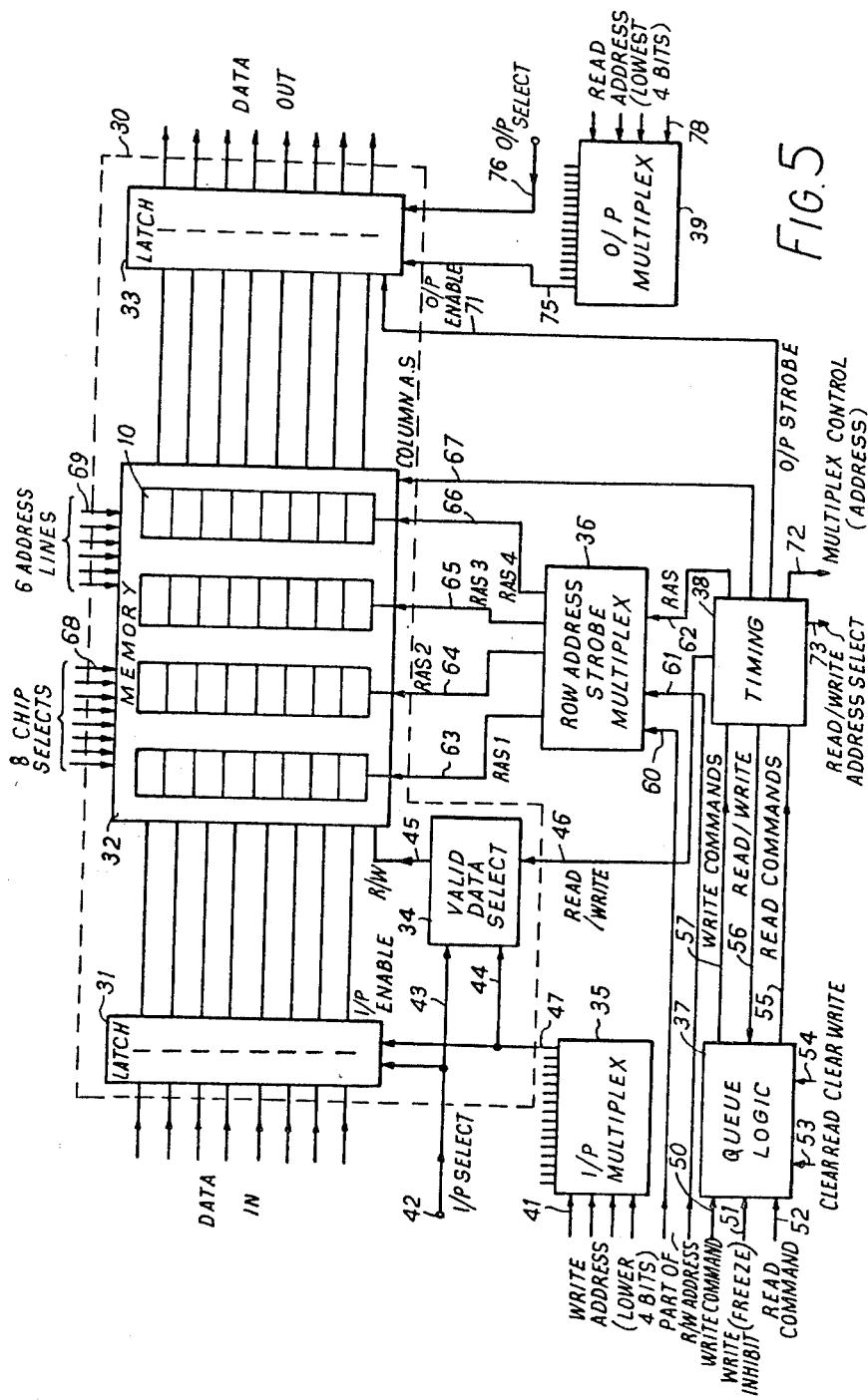

VIDEO DROP OUT COMPENSATOR INCORPORATING DIGITAL FIELD STORAGE

BACKGROUND OF THE INVENTION

This invention relates to a drop-out compensation system for the replay of television signals recorded on magnetic tape. The term "drop-out" is a known term in the television signal production art referring to the loss of signal occurring as a result of discontinuities in a signal caused by inconsistencies in the recording medium. Such inconsistencies may occur as a result of dirt on the magnetic tape or possibly as a result of a gap in the oxide layer of the tape.

The effect of drop-outs on a displayed television picture is to cause flashes in the displayed picture. To minimise the visibility of flashes on the displayed picture, various techniques have been used to compensate for the effects of drop-outs.

Detection of a "drop-out" can be arranged by monitoring the RF carrier signal used as the recording carrier in the video tape recorder (VTR).

A common form of compensation when a "drop-out" is detected is to effect repetition of the picture signal line preceding the drop out by the use of some storage medium.

To insert information from the previous television line or lines the drop out compensator (DOC) includes a delay circuit or store of one picture scanning line duration continuously fed with the replayed video signal; when a drop out occurs the signal at the output of the one line delay circuit is substituted, so that the missing picture information in a scanning line is replaced by that from a scanning line above that in which the drop out occurred, or more often from information occurring at least two lines above.

Such a system is described in British Pat. No. 1,436,757 (U.S. Pat. No. 3,949,416). Even with such compensation, when stationary images are being produced the compensated drop outs may still be noticeable.

OBJECT OF THE INVENTION

An object of the invention is to provide an improved compensation system to reduce the possibility of compensated drop outs being observed.

SUMMARY OF THE INVENTION

According to the invention there is provided a drop out compensation system comprising digital storage means for storing picture information from one or more previous video fields and detector means for detecting the presence of a drop out on an incoming signal to inhibit the writing in of the incoming picture information into the storage means whenever a drop out is detected.

The digital storage means may comprise the existing store of a digital framestore or fieldstore synchroniser.

Further according to the invention there is provided a method of compensating for drop outs on an incoming video signal comprising storing picture information from at least one field and detecting drop outs on the incoming signal to selectively inhibit storage of the incoming picture information whenever a drop out is detected.

BRIEF DESCRIPTION OF THE DRAWINGS

The invention will now be described by way of example with reference to the accompanying drawings in which:

FIG. 1 shows a drop out compensation system described in British Pat. No. 1,436,757 (U.S. Pat. No. 3,949,416), FIG. 2 shows the basic drop out compensation system of the present invention, FIG. 5 shows the construction of the store described in British patent application No. 6585/76 (U.S. Ser. No. 764,148) in which use is now made of the freeze control to provide a selective write inhibit for the data.

DESCRIPTION OF PREFERRED EMBODIMENTS

Figure 3:
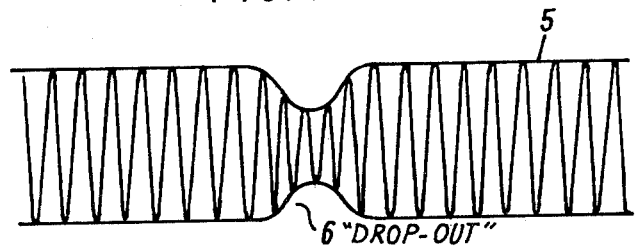
FIG. 3 shows a typical waveform produced at the replay head of a video tape recorder with a drop out present.

The drop out compensation system of FIG. 1 is connected in the circuit of a video signal processor, such as a digital time base corrector, by means of a switch 130, controlled by a drop out detector 131. A digital time base corrector is described for example in our co-pending British application No. 3207/76; British Pat. No. 1,515,584 (U.S. application Ser. No. 760,197; U.S. Pat. No. 4,065,787).

In a digital time base corrector the incoming analogue signal from the VTR is converted into digital form (typically 8 bit parallel) prior to storage in the time base corrector (TBC) digital line stores.

The digital signal from the TBC converter would be applied to input 120 of FIG. 1 and the output 133 would be connected to the TBC line stores.

The line stores of the time base corrector may be unable to cope with the digital data rate (typically 10.7 MHz) so the data is demultiplexed in the TBC (using data latches) to provide a 24 bit wide (8×3) parallel output, prior to storage. These data buffer latches may also serve as the switch 130.

In normal operation of the video tape recorder, the buffers forming switch 130 of FIG. 1 are disabled in accordance with a signal, or the lack of a signal, appearing at the control input 132 from the drop out detector 131 mentioned above, and the compensation circuit is unused. When a drop out occurs, this is detected by the drop out detector so that the buffers are disabled to open circuit the demultiplexing circuit output so that no information is fed into the compensation circuit 110, and to enable the buffer so that the stored information at that time is fed out of the 1 line store within block 110 into the output 133 to following circuits. After the drop out has occurred, the demultiplexing circuit output is connected to the output and the buffers disabled.

Consequently, should a further drop out occur at exactly the same point one line later the reinserted signal will not be a blank caused by the previous drop out, but will be the recirculated signal fed back from the store.

The present system shown in FIG. 2 uses a frame (or field) store 151 and write store control 150 in conjunction with the drop out detector 131. Such a frame store and control is described in co-pending British patent application No. 6585/76 (U.S. Ser. No. 764,148).

By using such an arrangement the compensating signal for a particular line will correspond to the same line (and indeed the same picture point within that line) from a previous field so that this will more closely simulate the information lost due to the drop out than in the earlier arrangements just described when information from an adjacent line was used to effect compensation. The improvement is particularly noticeable when the picture is a stationary image. When moving images occur drop out compensation errors are not so easily seen by the observer.

Thus the basic system of the invention allows existing digital field frame store synchronisers for example to be used with slight modification and some additional elements to inhibit the write operation into the store whenever a drop out is detected. A frame store synchroniser is described for example in co-pending British patent application Ser. No. 6588/76 (U.S. Ser. No. 769,615) now abandoned.

The drop out effect and its detection will now be described in more detail.

FIG. 3 shows the envelope 5 of a typical replay from a video tape recorder (VTR). The information is stored as a deviation of an RF carrier. During a drop out 6, the amplitude of the RF carrier is reduced significantly or altogether. If the amplitude is reduced by 6 dB for example, a drop out may assume to have taken place due to magnetic tape oxide wear.

Figure 4:
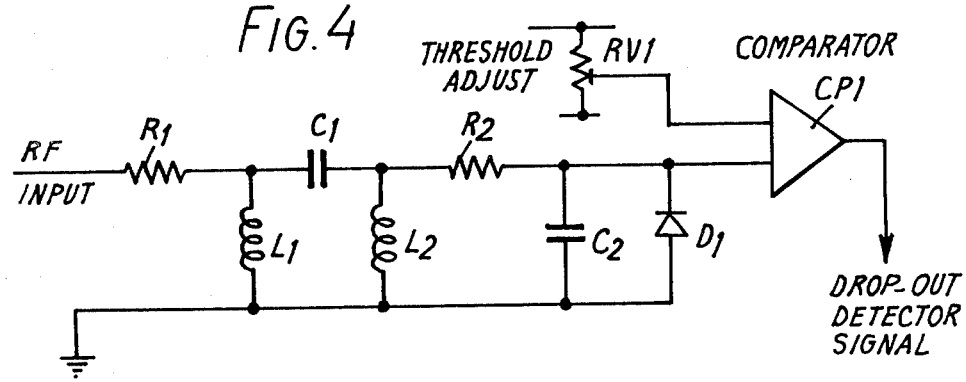
FIG. 4 shows an example of a drop out detector circuit.

A simple drop out detector circuit is shown in FIG. 4. The input circuit comprises input resistor R1, capacitor C1 and associated inductances L1,L2. The output via resistor R2 and associated capacitor C2 and diode D1 passes to comparator CP1. The comparator threshold is set by resistor RV1. The RF input is applied to the input circuit forming a high pass filter, which detector then peak detects the carrier envelope. The resultant voltage is applied to one side of the comparator and compared with a preset voltage. In the event that the level drops below the preset level, an output logical signal is generated to indicate the presence of a drop out.

The basic function of the drop out detector is to inhibit the writing of any further information into the store whenever a drop out is occurring as described with reference to FIG. 2 above. Thus the information previously stored is retained whenever a drop out occurs. The way in which the detector can inhibit the store is now described with specific reference to the video store referred to in the above mentioned patent application. FIG. 5 shows one store card 30 together with associated controls for the store disclosed in the aforementioned patent application. The operation of the store will now be described to give sufficient explanation of how it can be used in conjunction with the drop out detector.

The store card 30 is one of 16 incorporated within the framestore to provide the necessary storage capacity and includes block 32 of 4 rows of RAM chips 10 (the card being shown moved through 90°), each row comprising 8 chips (one for each of the 8 data bits). Thus, the total number of storage chips is 32. Each RAM chip may be provided by a known 4096 by 1 bit RAM which is addressable by strobing row and column addresses to latches within each RAM chip. The card 30 includes input data latches 31 and output data latches 33. The card also includes a valid data detector 34 described in more detail below. It is to be remembered that 15 other similar cards 30 (not shown) complete the store. Thus, an input multiplexer 35 has 16 outputs 47 for the 16 cards. One output is shown connected to the latch 31. Similarly, an output multiplexer 39 is shown with one output 75 connected to output latch 33. Although the remaining outputs of the input and output multiplexers are shown without connections, these in fact are connected to the other 15 cards. A row address strobe multiplexer 36 and timing control 38 provided have outputs commonly shared by the other 15 cards. A queueing logic circuit 37 (described below) is connected to the timing control 38.

Now since the input data for the cards comes via a common highway, this data must be latched into each card in turn by individual clocks so that after 16 clock periods, all 16 cards hold one word of data.

These first words are held in the first position in latches 31. The information is clocked into these files by the input enable signal, at video frequency received from input multiplexer output 47 and the address is set by input select signal received at input 42. Now when the first 16 words have been passed to the cards, the next 16 words appear in sequence on the highway and are again latched into the cards, except this time input select is changed so that these latest words are entered into the next position in the register file 31.

It will be clear that input select is, therefore, changing at 1/16 the original video frequency (as there are 16 cards). The output of the register files (latches) is controlled by the inverse of input select, this is all that is necessary to present the contents of the known registers on their output terminals. Now since input select is operating at 1/16 the video frequency, it will be obvious that the data presented on the outputs of the register files will be held constant for approximately 16 times the data period present on the original input highway.

Since the 4096 bit RAM chip is relatively slow in its operation, this internal demultiplexing is necessary to reduce the speed requirement for any individual chip. However, the external addressing system is still that of a conventional array. (The 9 bit binary address defines the line in the picture and another 9 bit address defines the picture point within the line.)

It will be clear that this demultiplexing, or apparently slowing down the input data has been achieved, and the input data is present on the input terminal of the 4K RAM for more than sufficient time for the RAM to absorb the information.

Now the addressing for the RAM enters as just 6 address lines at input 69 which carry the 12 bit address multiplexed in two halves (i.e. chip row address followed by chip column address). The individual device is selected by having 4 separate row address strobes RAS 1, 2, 3 and 4 on lines 63, 64, 65 and 66 respectively from row address strobe multiplexer 36 which receives row address strobes (RAS) from timer 38 at input 62, only one operating for each store cycle. These, of course, operate in turn, so the sequence of events for an address structure is the first 4 bits of the address entering at inputs 41 representing 16 cards are decoded to produce the input enables from input multiplexer 35, the next two bits of address entering at inputs 60,61 are decoded in the row address strobe multiplexer 36 to video is also received by frame identification circuit 135 which provides a single bit indicative of frame type for inclusion in the drop out store 152.

The output from the video data frame store 151 is applied to the digital to analogue converter 161 and thence to the video processor 162. A selector switch 163 is provided to choose either unprocessed or processed video data.

The video processor effects separation of chrominance and inversion to correct colour sub-carrier phase.

The selector switch 163 is under the control of process selector 158. The process selector receives the data bits from store 152 and compares this data with the output from frame identification circuit 156 which provides frame indication at the read side of the synchroniser from read sync pulse information. The control logic within process selector 158 will activate switch 163 to ensure correct colour sub-carrier phase maintanence whether or not drop outs have occurred.

Thus when the drop out 'tag' bit, which is passed through the store is detected as logical one in this position, it is indicative that the original video information came from the previous frame and therefore should be processed. The frame identification 'tag' bit indicates if the input frame is odd or even in the NTSC sequence which occurred during the detected drop out.

The frame identification circuits 135, 156 can conveniently be provided by the sampling phase identification circuit shown in U.S. Pat. No. 3,969,760 (British Pat. No. 1,467,730) and a circuit of this type is in any case incorporated within the frame store synchroniser for other purposes.

Figure 8:
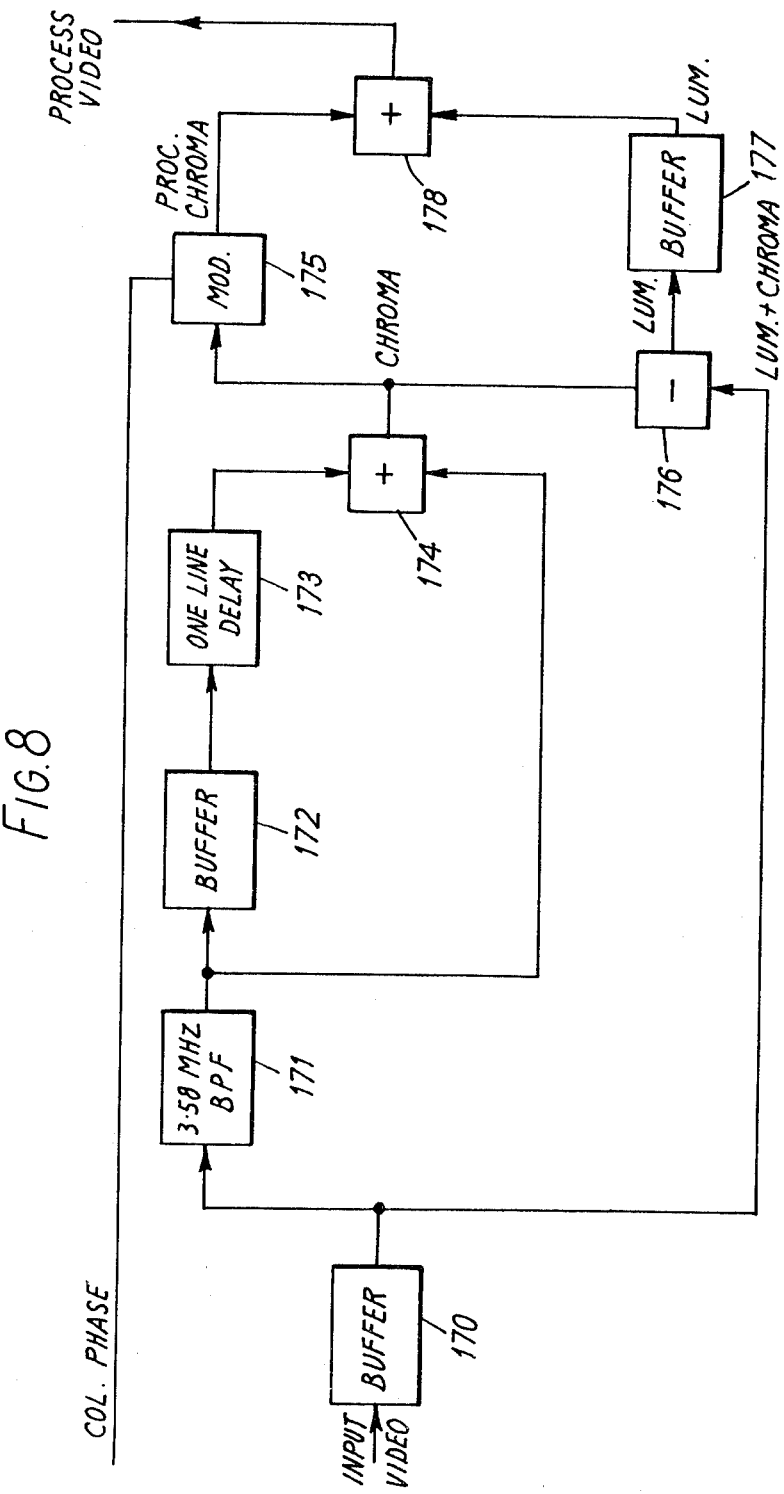
FIG. 8 shows a suitable arrangement for the output processor of FIG. 7.

FIG. 8 shows a block diagram for an output processor 162 which may be used to correct the colour subcarrier phase. Video information is first buffered in buffer 170 and then separated using a one-line delay comb filter comprising buffer 172, delay 173 and adder 174 preceded by a 3.58 MHz band pass filter 171. The separated chroma may then be phase modulated in modulator 175 to either be erect or inverted, dependent upon the condition of the colour phase input to the modulator. The resultant processed chroma information is then added back in adder 178 to the luminance previously separated in subtractor 176 and passed to adder 178 via buffer 177 to provide the processed output. The selection of whether or not to switch in the processor 162 is determined under the control of process selector 158 operating switch 163 as already mentioned.

The logic truth table below provides the necessary decision for whether or not to include the processor in the output path.

| INPUT FRAME TYPE | OUTPUT FRAME TYPE | DROP OUT PRESENT | DECISION PROCESS |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 0 |
| 1 | 1 | 1 | 0 |

The first column shows input frame identification and the second column shows output frame identification. The third column shows drop out data in which a logical one indicates the presence of a drop out. The decision to include processor 162 is indicated by the last column, a logical one indicating the inclusion of the output processor. Simple combinational logic elements are provided within selector 158 to provide the logic decisions for actuating switch 163.

Figure 7:
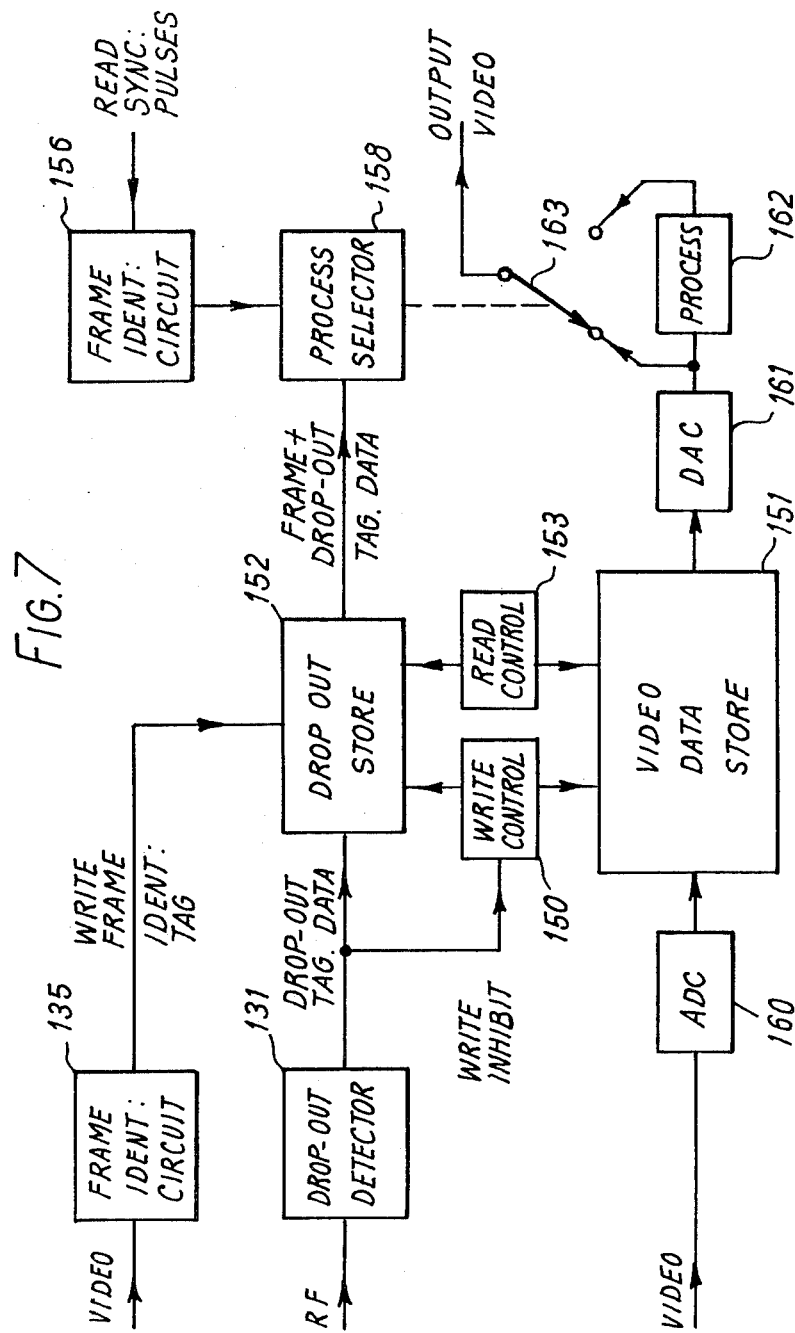
FIG. 7 shows an expanded store and drop out compensation system capable of handling the FIG. 6 format.

As previously explained the form of the drop out frame store shown in FIG. 7 may be identical to the video data frame store, although reduced to just 2 bits in place of 8. In the case of the PAL television system, an additional complication is caused by the 8 field sequence or four frame sequence. In order to determine the type of PAL frame which is present at the input and output, the system is expanded to provide 2 bits of storage to be allocated for frame identification, giving one out of four combinations. The principle is, however, similar in all respects to that described above for NTSC.

I claim:

1. A drop out compensation system for video information derived from a plurality of picture elements within a video field or frame, comprising:
   digital storage means for storing video information from one or more video fields;
   control means for controlling writing and reading of the video information into and from the storage means respectively;
   detector means for detecting the presence of a drop out on an incoming signal; and
   inhibit means for selectively inhibiting the control means to prevent writing in of the incoming video information into the storage means whenever a drop out is detected whereby information for the corresponding picture element from a previous field is retained for subsequent read out from the storage means.

2. A system according to claim 1, wherein the storage means comprises part of a digital synchroniser.

3. A system according to claim 1, wherein the video information includes a colour sub-carrier signal and wherein means are provided for generating frame type identity data concerning the incoming video information, additional storage means are provided to store data indicative of the presence of a detected drop out and frame type identity data, and process means are provided after said storage means to ensure correct colour sub-carrier phase maintenence on the information in dependence of the stored drop out and frame type identity data.

4. A system according to claim 3, wherein the process means comprises an output processor for inverting the phase of the colour sub-carrier adjacent to an output of the system and selector means for switching the output processor into the system in dependence on information received from said additional storage means.

5. A system according to claim 4, wherein output frame identification means are included to provide outgoing frame information for the selector means whereby the processor is switched into the system by said selector means when a difference between frames is detected together with the presence of a drop out.

6. A system according to claim 3, wherein the frame type identification and drop out data is stored in parallel with the video information as the lesser significant bits.

7. A system according to claim 3, wherein the additional storage means is provided as a separate store.

8. A system according to claim 4, wherein the output processor includes a chrominance separator and inverter.

produce the 4 row address strobes RAS 1, 2, 3, and 4. The final 12 bits are the main device address multiplexed in two halves in input 69. Column address strobe (CAS) is provided on line 67 from timer 38.

The output structure for the card is very similar to the input structure except of course it operates in reverse. Essentially, data is transferred in parallel from all 16 cards into their respective registers or latches 33. This transfer to the latches is effected by 'output strobe' received from timer 38 on line 71 and the register selected by 'output select' received externally at input 76. 'Output strobe' and 'output select' operate at 1/16 video frequency. The registers not occupied with the parallel transfer from the RAM are available for outputting their data onto the main highway by means of 'output enable' received from output 75 of output multiplexer 39 receiving a 4 bit read address at inputs 78; the appropriate device being chosen by the inverse of 'output select.' 'Output enable' operates serially (at video frequency) whereas 'output strobe' operates for all 16 cards in parallel.

The 8 chip select lines 68 enable any part of the digital word in store to be disabled and protected from the writing process if required. Thus, a different picture can be written in bits, say 1 to 4 than that held in bits 5 to 8.

The read/write lines and row address strobes (RAS) for the store card is not as straightforward as might have first been imagined. The complication is caused by what happens if one card in the group of 16 wants to be written into without any other cards being affected. This is simply achieved for input latches 31 by operating only the input enable corresponding to the card in question. However, when the data is transferred across in parallel, the store locations in 15 of the 16 cards would be receiving false information.

To prevent this receipt of false information the valid data detector 34 is provided which receives input selects and input enables at inputs 43 and 44 respectively, together with read/write signals at input 46 from timer 38. If an input enable is detected for this card from input multiplexer 35, the detector 34 allows the data entered into the latch 31 to be subsequently transferred to the store under control of read/write from output 45. If an input enable for that particular card is not received from input multiplexer 35, then the detector will not allow the store cycle to proceed.

Queueing logic block 37 also receives read/write signals on line 56 from timer 38. Write commands are received at input 50 of queueing circuit 37 and read commands at input 52. Write commands are received by timing circuit 38 from output 57 and read commands are provided from output 55 which are arranged to be temporarily held in block 37 if the store is busy with another part of its cycle which is detected from the read/write signals at input 56. Clear read and clear write facilities are provided at inputs 53 and 54 respectively. Additional timing signals are provided from timer 38 which are read/write address select at output 73 and multiplex address control at output 72 for use with the RAMs in known manner for addressing. Such addressing can be provided by three separate counters for write, read and refresh.

In addition to the normal write and read commands to the queue logic block 37, a freeze input 51 is provided in which when a freeze command is received no further information is allowed to be written into the store so that the data continuously read out will be the previously stored video data. This facility described in the aforementioned patent application effectively captures the video data which will usually be changing frame by frame and produces a frozen (i.e. still picture) in dependence on the stored data. The read and refresh addressing will still function as before. This freeze function can be used in the drop out compensator on a selective basis to provide write inhibit only when a drop out is detected so that normally incoming data will be entered into the store and will only be prevented from doing so when an inhibit signal is generated by detector 131. Data is retained in non-destructive read out from within the video data store for access later during a read operation.

The basic concept described in relation to FIG. 2 will now be expanded.

In the event that the digital framestore synchroniser stores information in a composite video form, the previous frame will contain the correct luminance information. However, the colour sub-carrier phase will be inverted. It will therefore be necessary to correct this phase inversion.

It is just possible however that in the next incoming frame a drop out could occur in exactly the same position. Should this be so, the correction will no longer be required as the colour sub-carrier will now be correctly in phase for the NTSC sequence.

Arrangements will now be described which can cope with these problems.

In the frame store described above, the video data is described as being of 8 bit format.

Figure 6:
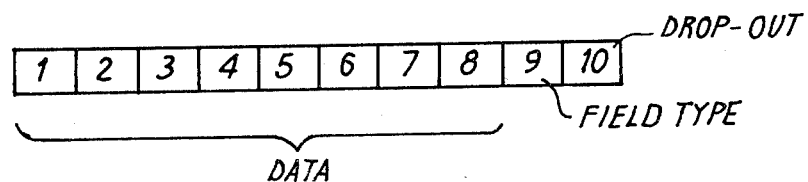
FIG. 6 shows a ten bit data format using the least significant bits for field and drop out indication.

FIG. 6 shows a 10 bit data word, in which the 8 most significant bits are allocated to video data, whilst the remaining 2 bits are allocated to storing information concerning the drop out. The least significant bit (bit 10) contains a logical one only if a drop out has taken place. For normal operation the contents of the least significant location will be logical zero.

The next to least significant bit (bit 9) contains information which indicates if the input frame is odd or even in the NTSC sequence which occurred during the drop out.

The existing frame store may be expanded to handle the 10 bit data word or alternatively a separate 2 bit frame store can be added to accommodate this additional data.

FIG. 7 shows the block diagram of the drop out compensator scheme in which a separate two-bit frame store is added to the existing 8 bit video frame store. The purpose of the separate two bit frame store 152 is to store the information concerning drop out and frame type as previously described. The drop out frame store may be added as an option to an existing synchroniser. The drop out framestore 152 will operate under write control 150 and read control 153 in similar manner to the video data store 151, the store address locations being run in parallel with the main video data frame store. Analogue to digital converter 160 and digital to analogue converter 161 are shown for handling incoming video data in analogue form and reconverting the data to analogue form after storage.

The drop out detector 131 has the RF input applied from the replay head of the VTR (not shown). Its output is applied to the drop out frame store 152 and to the write control circuit 150 of the video data store. The write control and read control system may parallel exactly that which exists within the video data frame store. Connection may be made in parallel so that video data is accessed together with the drop out data. The 9. A method of compensating for drop outs on incoming video information derived from a plurality of picture elements within a video field or frame, comprising:
storing video information from one or more video fields;
detecting the presence of a drop out on an incoming signal;
selectively inhibiting the storage of the incoming video information whenever a drop out is detected, and retaining information for the corresponding picture element from a previous field for subsequent read out from storage.

10. A method according to claim 9, wherein the video information includes a colour sub-carrier signal and the method includes storing additional information indicative of drop out presence and frame type identity and processing the video from storage in dependence on the additional information to ensure correct colour sub-carrier phase maintenance of the stored video information.

11. A method according to claim 10 wherein the processing of the video includes chrominance separation and inversion and is only effected when a difference between incoming and outgoing frame type identities is detected together with the presence of a drop out.

12. A method according to claim 10, wherein the additional information is stored in parallel with the video information in digital form as the lesser significant bits.